March 24, 1970     N. A. DE BRUYNE     3,502,886
PHOTOELECTRIC SENSOR FOR MERCURY THERMOMETER COLUMN
Filed Jan. 9, 1968     4 Sheets-Sheet 1
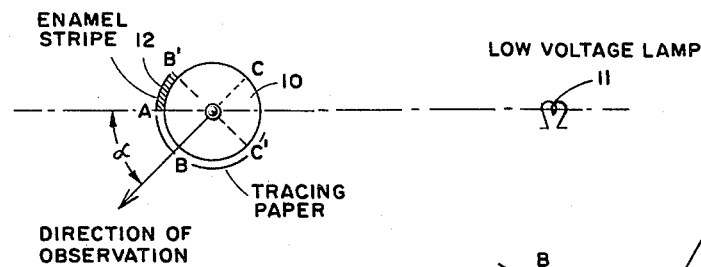
FIG. I
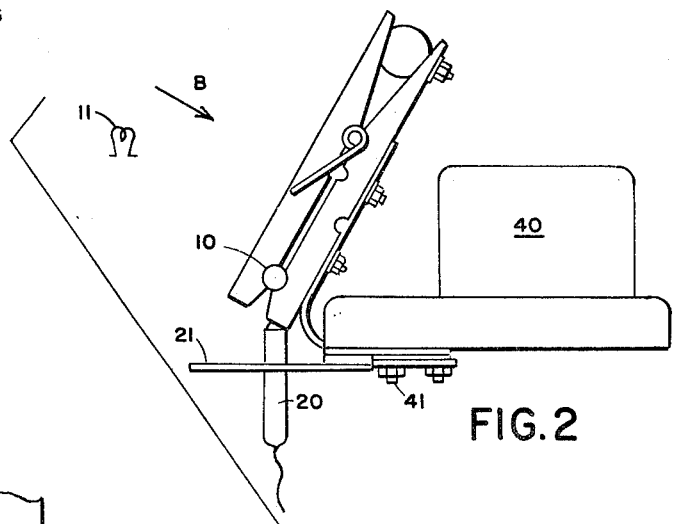
FIG. 2
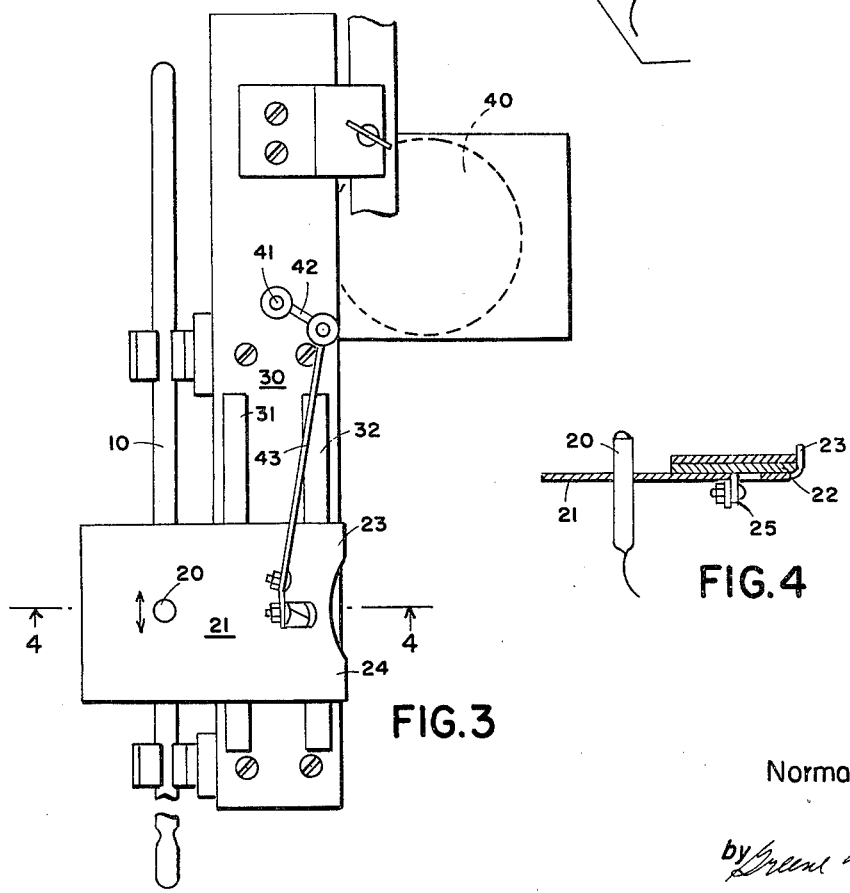
FIG. 3
FIG. 4
INVENTOR.
Norman A. de Bruyne
ATTORNEYS.

March 24, 1970   N. A. DE BRUYNE   3,502,886
PHOTOELECTRIC SENSOR FOR MERCURY THERMOMETER COLUMN
Filed Jan. 9, 1968   4 Sheets-Sheet 2
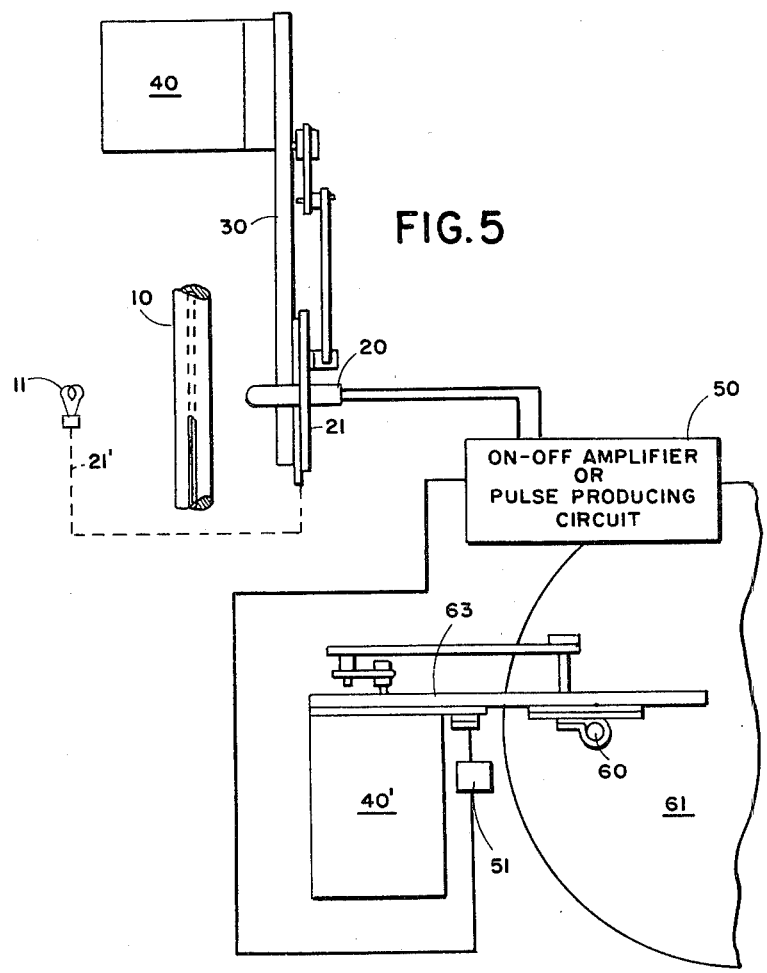
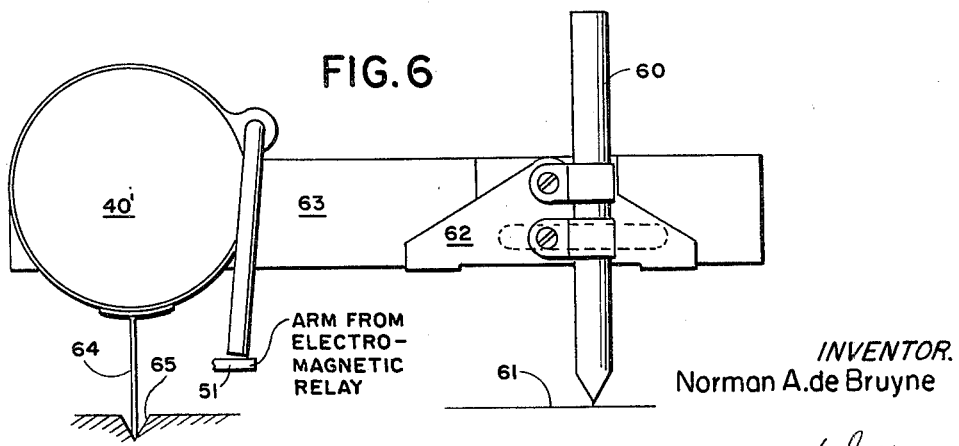
INVENTOR.
Norman A. de Bruyne
by Greene and Durr
ATTORNEYS.

March 24, 1970  N. A. DE BRUYNE  3,502,886
PHOTOELECTRIC SENSOR FOR MERCURY THERMOMETER COLUMN
Filed Jan. 9, 1968  4 Sheets-Sheet 3

INVENTOR.
Norman A. de Bruyne by *Bruene and Durr*

ATTORNEYS.

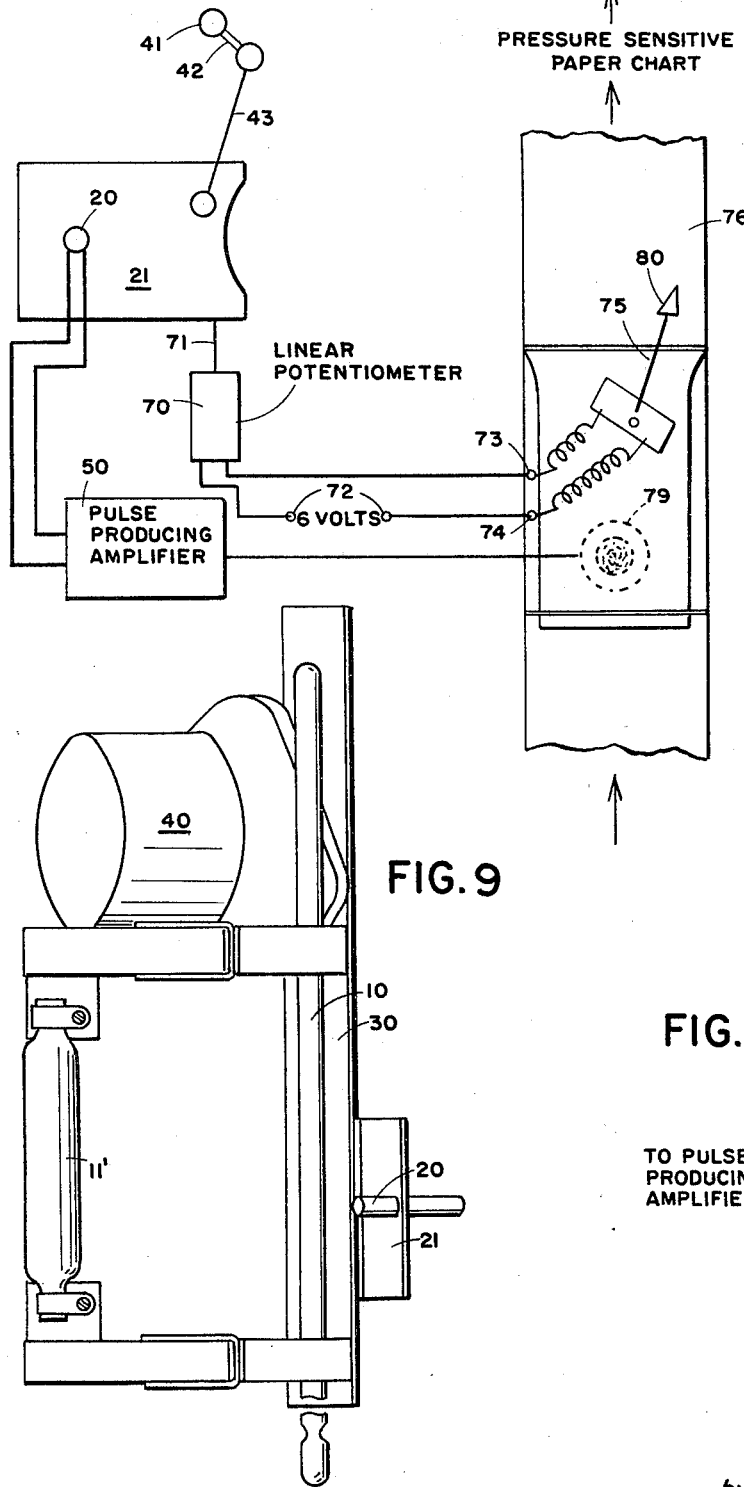
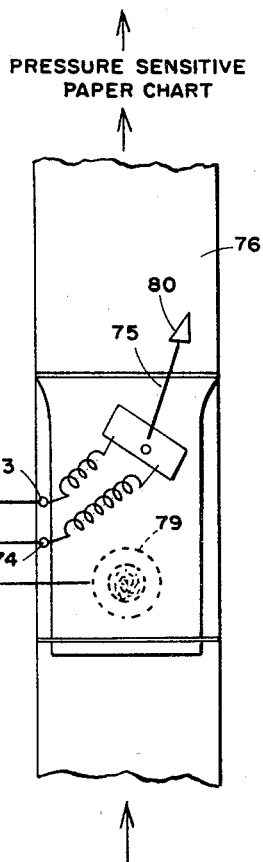
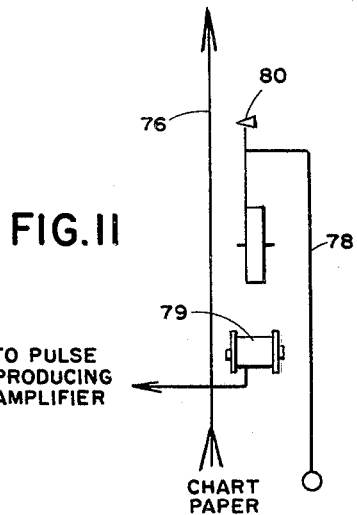

United States Patent Office 3,502,886
Patented Mar. 24, 1970

3,502,886
PHOTOELECTRIC SENSOR FOR MERCURY
THERMOMETER COLUMN
Norman A. de Bruyne, 661 Brunswick Pike,
Princeton, N.J. 08540
Filed Jan. 9, 1968, Ser. No. 696,561
Int. Cl. G01n 21/26
U.S. Cl. 250—218               2 Claims

ABSTRACT OF THE DISCLOSURE

The invention relates to a combination of a photoelectric cell, a source of light and a measuring instrument of the type which includes a capillary tube containing a column of mercury or similar pressure or temperature sensitive liquid whereby the level of the sensitive liquid in the tube can be sensed by the photoelectric cell without any additional lens or focusing device, as well as to additional means for moving the photoelectric cell with respect to the column of liquid to be sensed.

---

This invention relates to a method and apparatus for enabling a photoelectric cell to detect the position of a column of mercury in a glass stem thermometer or similar mercury column measuring instrument and to additional arrangements which depend on the activation of said photoelectric cell.

In thermometers of the type employed in chemical laboratories, the scale is engraved on the outside of the glass stem, the mercury moves in a fine capillary on the axis of the glass stem and a white or opaque enamel strip is formed back of the mercury column to make the engraved scale visible.

The problem in sensing the position of the mercury meniscus is basically to get a real image or sharp shadow of the meniscus on the light sensitive surface or electrode of a photoelectric cell. This is surprisingly difficult because the thermometer stem acts as a high power, cylindrical lens and because the diameter of the capillary is minute. One obvious solution would be to employ a microscope objective to project an image of the meniscus onto the photoelectric cell but this is cumbersome and expensive.

Among the objects of the invention is to provide an arrangement for obtaining a sharp image or shadow of the meniscus of a thermometer or similar instrument without the addition of a microscopic objective or any similar optical lenses.

Among other objects of the invention is to provide an apparatus for obtaining a sharp image or shadow of the meniscus on a photoelectric cell which does not obstruct the normal viewing of the thermometer.

This invention is based on the discovery that it is possible under suitable conditions of illumination to obtain a sharp shadow of the meniscus, greatly enlarged in width without any optical parts other than the glass stem of the thermometer.

In carrying out the invention, a lamp (which is preferably of relatively low voltage) is placed a short distance in front of the thermometer so that the opaque stripe does not obstruct illumination from the lamp. A distance of 5 cm. has been found very suitable but the distance is not critical. When this is done, two sharp shadows, enlarged in width, produced by the mercury column, can be detected at points about 60° in either side of the extended path of light between the lamp and the thermometer.

The lamp should be positioned on a radius (from the center of the thermometer) which does not pass through the opaque stripe and as a result, one of such images is usually not visible because the stripe interferes, but the other image appears on the side of the thermometer opposite to the side where the lamp is positioned. A photoelectric cell placed in the position to receive the sharp image of the mercury column is very effective as a sensing device to control temperatures of the media that contains the thermometer bulb.

The response of the photoelectric cell can be used to regulate the temperature or to receive the temperatures of the thermometer.

Further objects and advantages will become apparent as the description proceeds.

In the drawing:

FIG. 1 is a diagrammatic view showing the principle of the location of the lamp and photoelectric cell.

FIG. 2 is a top view showing one form of the apparatus.

FIG. 3 is a side view of the arrangement shown in FIG. 2.

FIG. 4 is a detail view taken on line 4—4 of FIG. 3.

FIG. 5 is a partially diagrammatic view of a recording apparatus embodying the device of FIGS. 1–4.

FIG. 6 is a detail view of the recording means of FIG. 5.

FIG. 9 is a side view of a device such as illustrated in FIG. 3 but taken at an angle to show an attached light bulb.

FIG. 10 is a diagrammatic view of an alternative method of keeping the recorder in phase with the photoelectric cell and lamp.

FIG. 11 is a side view of the recording means of FIG. 10.

Figure 7:
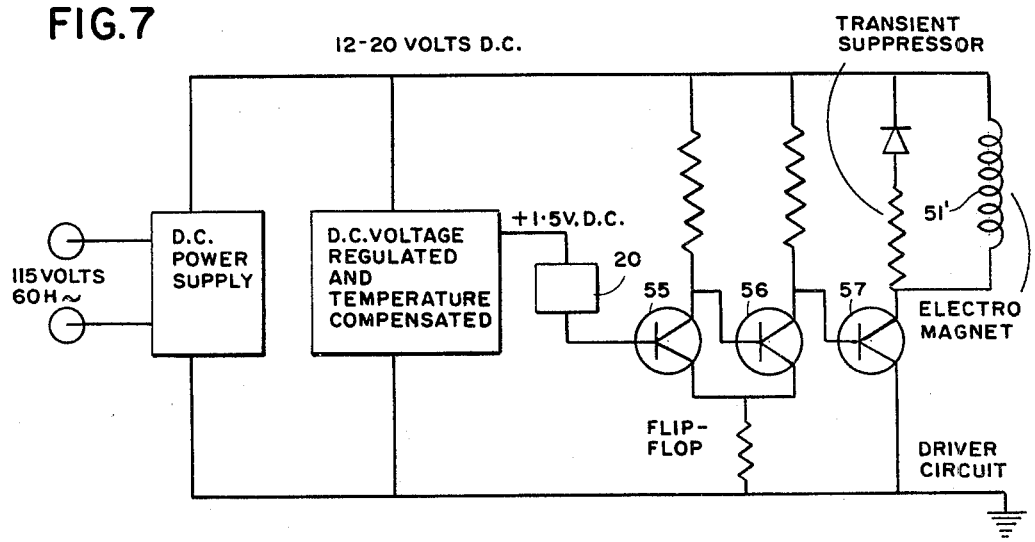
FIG. 7 is a detail view of a circuit useful in the apparatus of FIG. 5.

As stated above the broadened shadow of the mercury column appears at an angle of about 60° to the direction of the light beam passing beyond the mercury column of a thermometer or similar device which makes use of a column of mercury in a capillary tube. FIG. 1 shows how to determine this angle accurately. Thus if the thermometer 10 is illuminated by lamp 11 which preferably is not exactly normal to the arc defined by the enamel strip 12 of the thermometer, if a piece of tracing paper or similar transluscent material is placed around the thermometer shown, a broadened image of the mercury meniscus will be found in the region B of said tracing paper. The angle alpha as shown in the figure is approximately 60°. It is believed that an explanation of this phenomena is that approximately total internal reflection takes place inside of the glass/air interface at C and C' (as though two narrow silvered mirrors were present at these positions) reflecting diverging light to B and B' and causing a shadow of the meniscus to be thrown onto B and B' respectively. In the arrangement shown, the image at B' would not be visible because of the enamel stripe. The image at B is sharp and free from glare and is suitable for controlling a photoelectric cell directed in the angle and toward said thermometer.

One way of making use of this phenomenon is disclosed in FIGS. 2–5, wherein the photoelectric cell 20 is mounted on a slide carrier 21 which is mounted for movement parallel to the thermometer 10 at the angle alpha (FIG. 1) with respect to the lamp 11.

In the device as shown in FIG. 3, the carrier 21 is mounted to slide up and down in a vertical direction on the ferromagnetic support 30. The carrier 21 has a magnet 22 secured thereto which preferably has a low friction coating such as Teflon thereon. Edges 23 and 24 of the carrier 21 extend over the edge of the support 30. Since these edge tabs 23 and 24 are of ferromagnetic material and in contact with the magnet 22 they act as magnets to hold onto the edge of support 30 and retain the carrier 21 in its proper lateral position. Low friction tracks 31 and 32 are provided on the support 30. A motor 40 is provided which is preferably fitted with a gear reduction train with an output shaft 41. The output shaft 41 is connected to the slidable carrier 21 through crank 42, link 43 and the ear 25 of carrier or slide 21. It will be understood that in some ararngements it is not necessary to oscillate the photoelectric cell 20 but in many cases it is desirable as will be apparent from the description which follows.

FIG. 5 discloses means for recording temperatures as as measured by the thermometer 10. Thus the output of the photoelectric cell is connected to an On-Off Amplifier or to a pulse producing circuit 50. The output of the relay or pulse producing circuit 50 is connected to an electromagnet 51. A pen 60 is positioned to mark the rotating paper disk 61. The pen 51 is carried on an arm 62 slidably mounted on bracket 63 which is secured to motor 40'. The motor 40' is driven in synchronism with motor 40 so that at any time the position of arm 62 is related to the position of the photoelectric cell 20. Motor 40', however, is supported on a knife edge device 64, 65 and is so supported that the pen 60 is out of contact with the paper disk 61. When the photoelectric cell 20 crosses the meniscus of the thermometer 10 in one direction the electromagnet 51 is activated when device 50 is a steady ON or OFF circuit such as shown in FIG. 7 and, when the meniscus is crossed in the opposite direction the electromagnet is deactivated. The result therefore, is a series of lines which are interrupted at the series of temperatures as determined by the thermometer.

The ON or OFF circuit of FIG. 7 is not a part of this invention and has been added only to show a complete operating device. This circuit is known as the "TR3 Photoelectric Relay" of Farmer Electric Products Co., Inc. The photocell 20 employed in this circuit is a TPC–OL Cadmium Selenium Cell. In the circuit, the output of the photoelectric cell is fed to the base of a first transistor 55 of a transistor flip-flop circuit 55, 56, the output of the flip-flop circuit being fed to a driver circuit 57 which controls the coil 51' of the electromagnet.

When device 50 is a pulse-producing amplifier, a pulse is fed to electromagnet 51 each time that the photoelectric cell crosses the meniscus from either direction and the resultant recording is a series of dots indicating the temperatures at the specified times on the moving disk 61. Various forms of pulse-producing circuits capable of operating on the output of a photoelectric cell are known in the art and do not form a part of the present invention. A pulse-producing device commercially available from Farmer Electric Products Company of Natick, Mass. and known as the Model TR4–2 Logic Module has been successfully used as the device 50 in FIG. 5.

Figure 8:
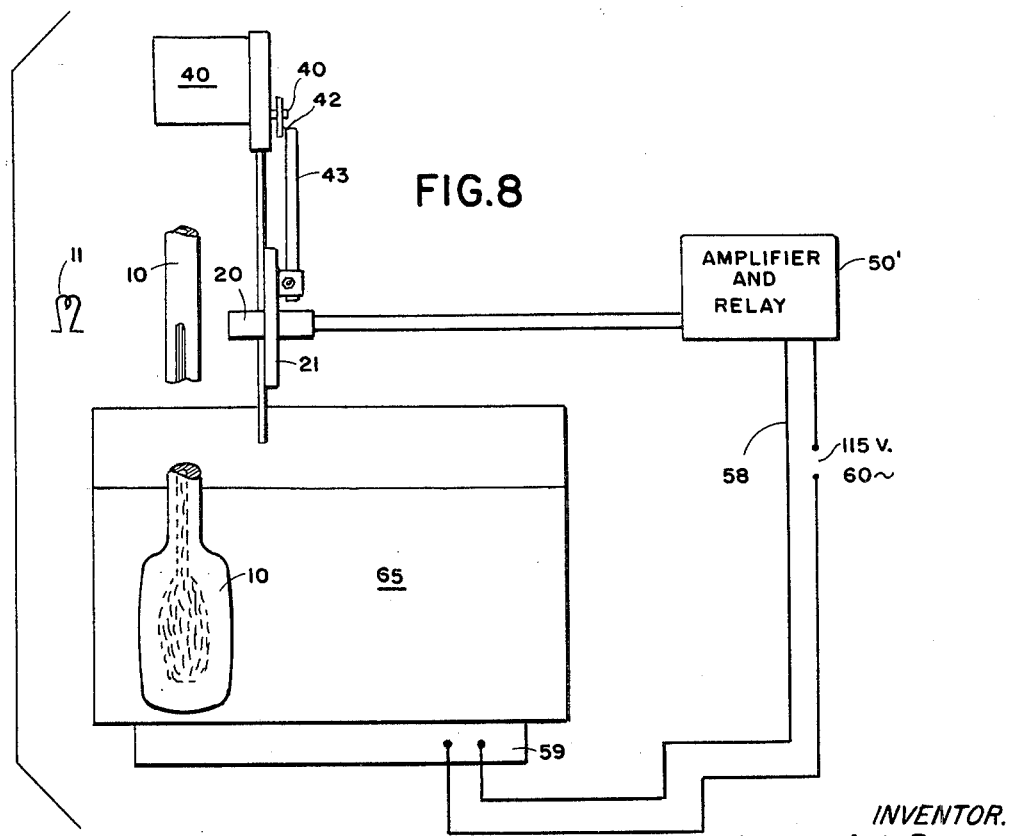
FIG. 8 is a partially diagrammatic view of an apparatus for controlling temperature with the device of FIGS. 1–4 as the sensing means.

FIG. 8 discloses how the sensing device of the invention is connected to maintain a bath at a given temperature. In this case, the photoelectric cell 20 is connected to an On-Off Amplifier 50' actuating a relay which switches a supply of electric energy to heater 59. With this arrangement, the slider 21 is oscillated from a position slightly below the meniscus to a position slightly above. This provides a very effective "Gouy" type regulation of the temperature in bath 65, for example.

It will be realized that in the event that wide variations of temperature are to be recorded and for precise measurements with an apparatus such as that shown in FIG. 5, it is also preferable to oscillate the light source 11 synchronously with the photoelectric cell and supply a lamp 11 which has a filament that is horizontal or parallel to the tangent to the meniscus. Where high precision is not a requirement, a longitudinal light bulb 11' such as illustrated in FIG. 9 may be employed. The mechanical connection between carrier 21 and lamp 11 is illustrated by dotted line 21' in FIG. 5.

According to the arrangement shown in FIG. 10, the carrrier 21 is mechanically attached to the linear potentiometer 70 by any form of link 71. The potentiometer 70 should have a maximum resistance of about 1000 ohms and is connected in series with a source of constant voltage 72, 6 volts for example, and with the terminals 73, 74 of a milliampere which includes a needle 75 attached to its moving coil. The linear potentiometer known as the Giannini Model 8620 L "Rectipot" operates very satisfactorily. In this arrangement, the needle or writing arm 75 therefor oscillates back and forth across the recording chart 76 in phase with the movement of the carrier 21 and the photoelectric cell 20. A chopper bar 77 carried on hinged arm 78 which is magnetic is provided. The output of the pulse-producer 50 actuated by the photoelectric cell 20 is connected to the electromagnet 79. The needle 75 is provided with an inking tip 80 so that when the photoelectric cell passes the meniscus of the thermometer the electromagnet operates to press writing tip 80 against the chart paper 76. The chopper bar, pulsed by the photoelectric cell, will produce a series of dots on the chart 76.

The scanning system of the invention gives a reading which is more accurate than the human eye and also produces an accurate recording of the readings. By making the amplitude of oscillation of the pen in FIGS. 5, 6, 10 or 11 larger than the amplitude of oscillation of the photoelectric cell and maintaining their oscillations in phase as described, it is possible to expand the scale of readings. For example, it has been found possible to record a hundredth of a degree C. with a thermometer 10 which is graduated in tenths of a degree C. Thus when the pen 60 of FIG. 5 or 80 of FIG. 10 has an amplitude which is ten times that of the photoelectric cell and when the graduations on the thermometer are about 1 mm. apart, then each mm. of the recording chart represents one hundredth of a degree C. There is a limit to the magnification obtainable in this way due to the behavior of the mercury meniscus; under sufficient magnification it can be seen to move in discrete steps.

The features and principles underlying the invention described above in connection with specific exemplifications will suggest to those skilled in the art many other modifications thereof. It is accordingly desired that the appended claims shall not be limited to any specific feature or details thereof.

I claim:

1. A device for sensing the level of the meniscus in a capillary mercury column such as the mercury column of a thermometer, consisting essentially of a source of light positioned in front of and approximately at the level of the mercury column of said thermometer, a photoelectric cell, and means for holding said photoelectric cell in a position directed toward said column of mercury at an angle of about 60° with respect to the extended line from the source of light through said capillary as measured in a plane at right angles to the axis of the thermometer column.

2. The device as claimed in claim 1 comprising means for slidably mounting the means for holding said photoelectric cell and means for oscillating said cell holding means in a vertical direction.

References Cited

UNITED STATES PATENTS 2,764,178  9/1956  Paul et al. _____ 250—218

RALPH G. NILSON, Primary Examiner

M. ABRAMSON, Assistant Examiner